Dec. 3, 1968  H. K. GUMMEL ET AL  3,414,689

SHOCK-MOUNTING FOR ELECTROMECHANICAL TRANSDUCER

Filed June 28, 1965  2 Sheets-Sheet 1

INVENTORS H. K. GUMMEL
V. L. RIDEOUT
BY
*Sylvan Sherman*
ATTORNEY

United States Patent Office 3,414,689
Patented Dec. 3, 1968

3,414,689
SHOCK-MOUNTING FOR ELECTRO-MECHANICAL TRANSDUCER
Hermann K. Gummel, North Plainfield, and Vincent L. Rideout, Chatham, N.J., assignors to Bell Telephone Laboratories, Incorporated, New York, N.Y., a corporation of New York
Filed June 28, 1965, Ser. No. 467,212
6 Claims. (Cl. 179—184)

ABSTRACT OF THE DISCLOSURE

This application describes a shock mounting for a semiconductor electromechanical transducer. The transducer is mounted between two substantially identical diaphragms, and disposed within an enclosure which permits acoustical pressure to be applied equally to the two diaphragms. When dropped or subjected to other severe shock, both diaphragms experience the same transient mechanical motion so that the net stress on the transducer is small. However, both diaphragms are fully subjected to useful acoustical pressure for maximum response.

---

This invention relates to electromechanical transducers and, in particular, to means for shock-mounting such transducers.

In the copending application by D. Kahng and S. H. Wemple, Ser. No. 467,211, filed concurrently with this application and assigned to a common assignee, there is described a semiconductor electromechanical transducer. As the achievable sensitivity of a semiconductor transducer is related to the stress that can be applied to the crystal element, the crystal is preferably made very small. As a consequence, such devices tend to be relatively fragile and, advantageously, should be protected from excessive stress as might be encounteretd if accidentally dropped or otherwise subjected to servere shock.

It is, accordingly, the broad object of this invention to shock-mount electromechanical transducers, particularly of the kind described in the above-mentioned copending application.

In accordance with the invention, the transducer is mounted between and stressed by a pair of resilient members, or diaphragms. The dynamic properties of the diaphragms are such that their central regions, which contact the transducer, experience substantially the same transient mechanical motion when subjected to mechanical shock. In the illustrative embodiments to be described, these conditions are most easily satisfied by the use of two substantially identical diaphragms.

In a first embodiment of the invention, the diaphragms are mounted back-to-back on a hollow frame such that the adjacent back surfaces of the diaphragms and the inner surface of the frame enclose a common region. The transducer is connected between the back surfaces of the diaphragms within the enclosed common region.

The diaphragms, frame and transducer are, in turn, mounted within an enclosure which couples acoustical wave energy essentially equally to the front surfaces of the diaphragms for maximum useful response.

In a second illustrative embodiment, the diaphragms are mounted back-to-back within the enclosure such that the acoustical wave energy is coupled to the exposed back surfaces of the diaphragms.

Upon exposure to shock, the diaphragms in both embodiments tend to undergo the same transient mechanical motion so that the net stress transmitted to the transducer is small.

These and other objects and advantages, the nature of the present invention, and its various features, will appear more fully upon consideration of the various illustrative embodiments now to be described in detail in connection with the accompanying drawings, in which.

Figure 1:
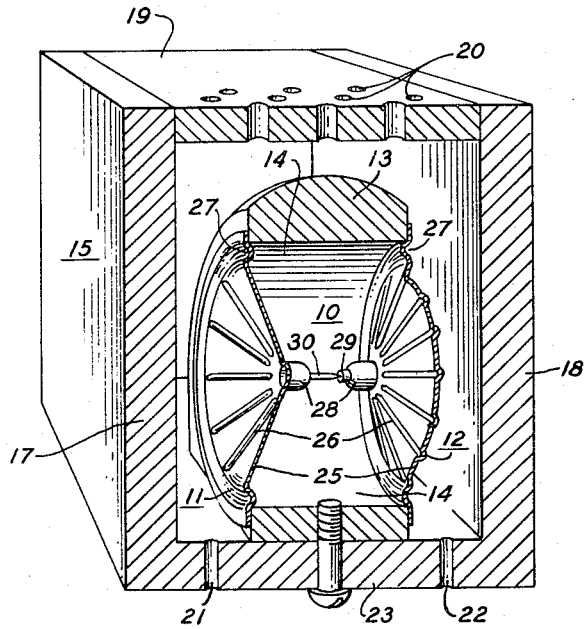
FIG. 1 shows a first embodiment of a shock-mounted transducer in accordance with the invention.

Referring to the drawings, FIG. 1 shows a microphone including an electromechanical transducer 10, shock-mounted in accordance with a first embodiment of the present invention, between a pair of substantially identical diaphragms 11 and 12. The diaphragms are designed to vibrate back and forth in response to acoustical pressure waves and, in so doing, to apply a varying pressure to the transducer 10.

In one model of a shock mounting, constructed in accordance with the present invention, the diaphragms used were the type described in United States Patent 2,607,859. As illustrated in FIG. 1, each diaphragm comprises a lightweight, metallic, shallow frusto-conical portion 25, provided with an annular corrugation 27 about its outer periphery, and reinforcing radial flutes 26. Affixed at the center of the back surface of each diaphragm, and vibrating therewith, is a metallic, dome-like electrode 28 to which the transducer 10 connects. Where a semiconductor transducer of the type described in the above-mentioned copending application is employed, the semiconductor crystal 29 is mounted on the electrode of one of the diaphragms 11 and the stylus 30 is mounted on the electrode of the other diagram 12. The stylus extends from the electrode on diaphragm 12 and makes contact with the crystal 29.

The diaphragms are mounted back-to-back along their outermost edges on a hollow frame 13, such that the adjacent back surfaces of the two diaphragms and the inner surface of frame 13 completely enclose a common region 14.

The frame, and the diaphragms mounted thereon, are symmetrically placed within an enclosure 15 with the lower portion of frame 13 secured to the bottom wall 23 of enclosure 15. The respective diaphrams are equally spaced from, and face, the pair of opposite solid walls 17 and 18 of the enclosure. The upper wall 19 of enclosure 15 is supplied with a plurality of apertures 20 for coupling acoustic wave energy into and/or out of enclosure 15. A pair of presure release holes 21 and 22 are located in the bottom wall 23 of the enclosure.

The enclosure 15 and frame 13 can be made of any suitable rigid material, such as a metal or a plastic, depending upon the particular application at hand. In a telephone handset, for example, the frame and enclosure are typically made of a material such as polystyrene.

In normal operation, acoustical pressure waves, originating from without enclosure 15, are incident upon the perforated surface 19, and are transmitted to within the enclosure through the apertures 20. Because of the symmetrical construction of the device, these pressure waves impinge upon the front surfaces of both diaphragms with essentially equal intensity, causing the diaphragms to move alternately inward, towards each other, and outward, away from each other, in synchronism. This motion is transmitted to the transducer 10, and is translated into electrical signals by suitable electrical circuitry which has not been included in FIG. 1. (For a discussion of the operation of a semiconductor transducer, see the above-mentioned copending application.)

If a microphone employing a sensitive transducer (but not employing the balanced mounting described herein) is dropped, the stresses produced in the transducer could exceed the maximum permissible stress the transducer is capable of withstanding and, thus, cause permanent damage to the transducer. In accordance with the present invention, stresses produced under unusual conditions are minimized by the double diaphragm construction described herein. For typical diaphragms, the center region, that is, the region of the diaphragm contacting the transducer, is capable of the greatest displacement in a direction perpendicular to the face of the diaphragm. Such displacements, if not balanced, would present the greatest potential hazard to the transducer. By virtue of the double diaphragm construction, any sudden acceleration (or deceleration) perpendicular to the faces of the diaphragms, induces substantially the same transient mechanical motion in the two diaphragms. Thus, both ends of transducer 10 undergo essentially equal and parallel translation and the net stress set up within the transducer is maintained within safe limits. The net stress due to displacement of the diaphragms resulting from any sudden acceleration (or deceleration) parallel to the faces of the diaphragms, is typically not a serious problem.

The particular diaphragms used to construct the embodiment of the invention shown in FIG. 1, and described hereinabove, were used primarily because of their availability to applicants they being diaphragms from an ordinary telephone microphone. These diaphragms, nevertheless, gave satisfactory shock protection when used with transducers of the type described by Kahng and Wemple in their copending application. However, in order to minimize the stresses induced in the transducer due to sudden acceleration (or deceleration) in a direction parallel to the face of the diaphragm, the diaphragms are preferably made as shallow as possible. In addition, the diaphragms, preferably would not include the dome-like electrode 28. Advantageously, the mass of the diaphragm in the region to which the transducer connects, and the space between the diaphragms, are made as small as possible consistent with all of the other electrical and mechanical requirements of the diaphragms.

Figure 2:
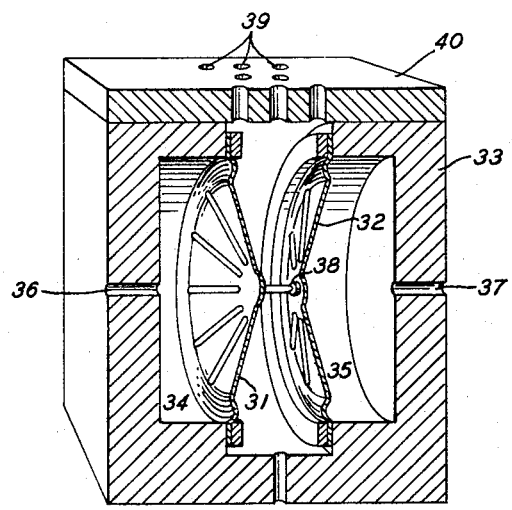
FIG. 2 shows a second embodiment of the invention.

FIG. 2 shows a second embodiment of the invention which differs from the embodiment of FIG. 1 in that the acoustical wave energy is coupled to the back surfaces of the diaphragms instead of to the front surfaces of the diaphragms.

Referring to FIG. 2, a pair of shallow diaphragms 31 and 32, of a preferred configuration, are mounted back-to-back on opposite sides of enclosure 33, and a transducer 38 is connected therebetween. Advantageously, the mass of each diaphragm in the region to which transducer 38 connects is small. In addition, the distance between the diaphragms is also small. The combination of shallow diaphragms, small mass and small spacing greatly minimizes tendency of the diaphragms to twist when subjected to large acceleration in the direction parallel to the face of the diaphragms. This, in turn, tends to minimize the stresses generated in the transducer.

The front surface of each diaphragm and the adjacent inner surface of enclosure 33, enclose separate regions 34 and 35. Pressure relief apertures 36 and 37 are provided in enclosure 33 for each of the enclosed regions.

Coupling apertures 39 are included in the upper wall 40 of enclosure 33 for coupling acoustical wave energy into the region of the enclosure between the two diaphragms. Thus, in this embodiment of the invention, the acoustical energy is coupled equally to the back surfaces of the diaphragms.

It is a particular advantage of the embodiment shown in FIG. 2, that it can be accommodated in a much smaller space than can the embodiment of FIG. 1.

Figure 3:
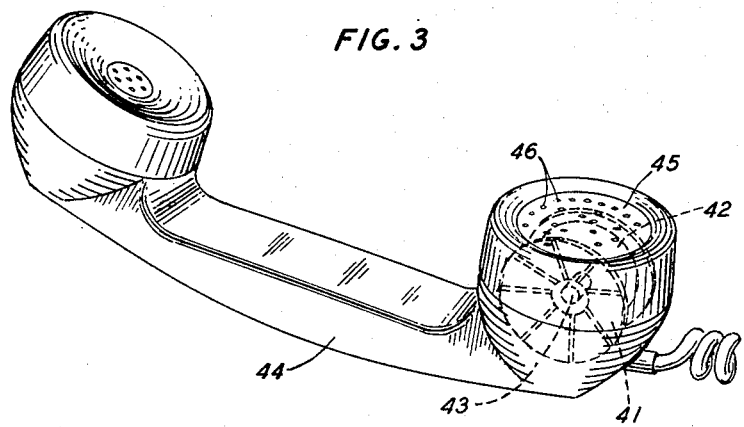
FIG. 3 shows a shock-mounted transducer in accordance with the invention, adapted for use in a telephone handset.

FIG. 3 shows a shock-mounted transducer in accordance with either embodiment of the invention, adapted for use as a transmitter in a telephone handset. Illustrated are the two diaphragms 41 and 42 and a transducer 43 mounted therebetween. The diaphragms are mounted in the handset 44 with their effective apertures perpendicular to the protective, covering mouthpiece 45. So mounted, both diaphragms are equally exposed relative to the mouthpiece such that acoustic waves entering the handset through apertures 36 in the mouthpiece impinge substantially with equal intensity upon the two diaphragms.

While a particular type of diaphragm, and a particular type of transducer have been described in connection with the illustrative embodiment of the invention shown in FIG. 1, it is to be understood that the invention is not intended to be limited to any particular type of diaphragm or transducer. In general, the invention has application to any situation requiring shock-mounting of a semiconductor electromechanical transducer. In addition, the shock-mounting arrangement described herein can similarly be used in a loudspeaker embodiment in instances where the electromechanical transducer must be protected from unusual stresses. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A shock-mounting for a semiconductor electromechanical transducer comprising:
   a hollow supporting frame;
   a pair of resilient members mounted on said frame and characterized in that the central regions of said members have substantially the same dynamic properties;
   said frame and said members enclosing a common region;
   a semiconductor transducer including a pair of electrically conductive electrodes mounted between and supported solely by said members at their central regions;
   and an enclosure surrounding said members and adapted for coupling acoustic wave energy from without said enclosure to both of said members with substantially equal intensity.

2. The combination according to claim 1 wherein said resilient members are substantially similar.

3. In a telephone including a transmitter and a covering mouthpiece, said transmitter comprising:
   a hollow supporting frame;
   a pair of essentially identical resilient diaphragms having front and back surfaces mounted on said frame;
   a pressure sensitive semiconductor element including a pair of electrically conductive electrodes mounted between and supported solely by said diaphragms at their centers;
   said transmitter being mounted in said telephone with corresponding surfaces of said diaphragms substantially equally exposed to said mouthpiece.

4. A shock-mounting for a semiconductor electromechanical transducer comprising:
   a pair of diaphragms having front and back surfaces mounted with the back surface of one adjacent to and facing the back surface of the other;
   said diaphragms characterized in that the central regions of said diaphragms have substantially the same dynamic properties;
   a semiconductor transducer including a pair of electrically conductive electrodes mounted between and supported solely by said diaphragms at their central regions;

and an enclosure surrounding said diaphragms and adapted for coupling acoustical wave energy to both of said diaphragms with substantially equal intensity.

5. The mounting according to claim 4 wherein said acoustic wave energy is coupled exclusively to the back surfaces of said diaphrgams.

6. The mounting according to claim 4 wherein said acoustic wave energy is coupled exclusively to the front surfaces of said diaphragms.

References Cited

UNITED STATES PATENTS

| | | | |
|---|---|---|---|
| 2,198,424 | 4/1940 | Baumzweiger | 179—110 |
| 2,403,692 | 7/1946 | Tibbetts | 179—110 |
| 2,647,162 | 7/1953 | Duncan | 179—121 |
| 3,323,358 | 6/1967 | Fraioli | 179—110 |

KATHLEEN H. CLAFFY, *Primary Examiner.*

A. A. McGILL, *Assistant Examiner.*